UNITED STATES PATENT OFFICE.

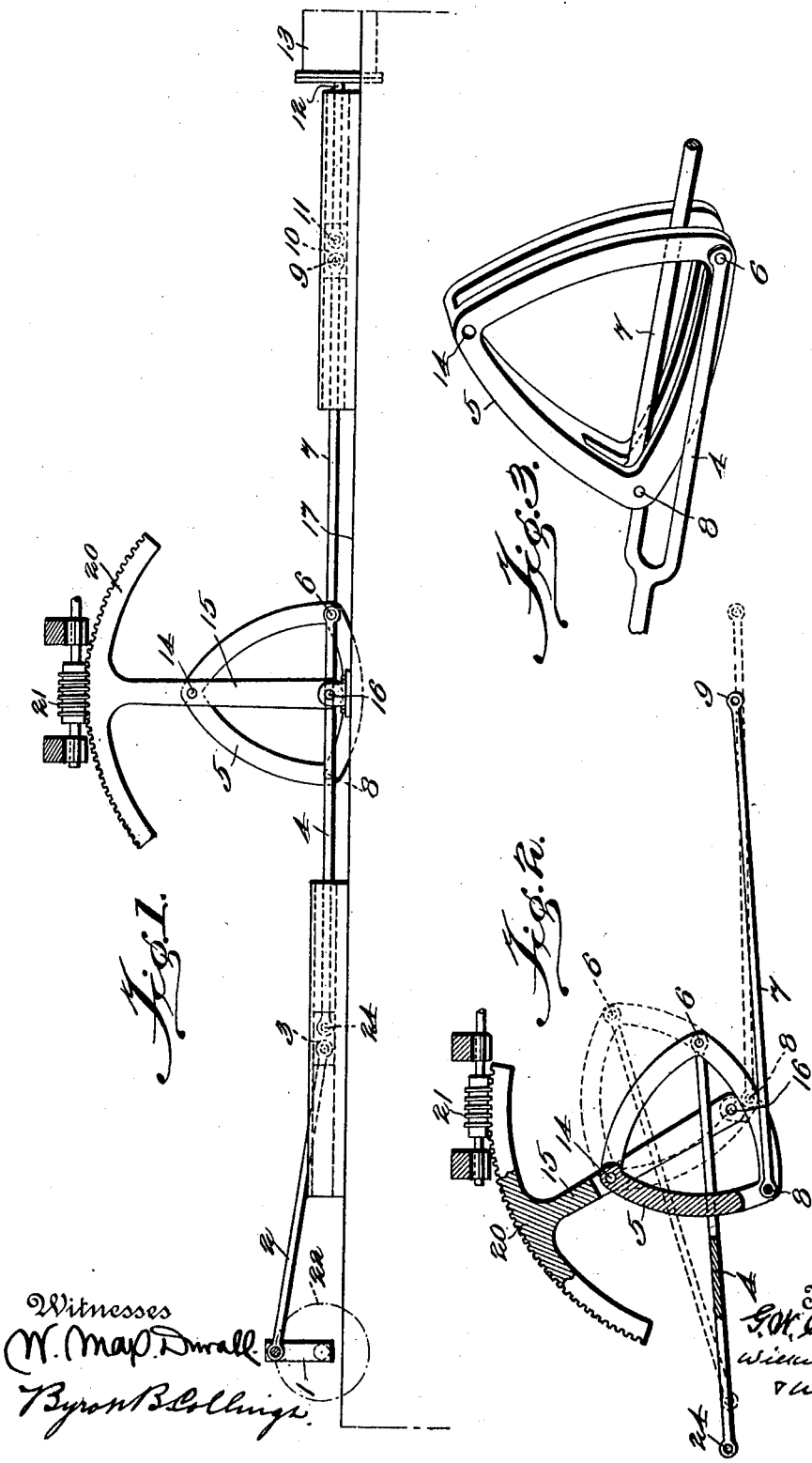

GEORGE W. CAMPBELL, OF EL PASO, TEXAS, ASSIGNOR OF ONE-HALF TO HAROLD A. HOLLISTER, OF SANTA BARBARA, CALIFORNIA.

MECHANICAL MOVEMENT.

1,020,261. Specification of Letters Patent. Patented Mar. 12, 1912.

Application filed July 29, 1910. Serial No. 574,568.

*To all whom it may concern:*

Be it known that I, GEORGE W. CAMPBELL, a citizen of the United States, residing at El Paso, in the county of El Paso and State of Texas, have invented certain new and useful Improvements in Mechanical Movements; and I do hereby declare the following to be a full, clear, and exact description of the invention, such as will enable others skilled in the art to which it appertains to make and use the same.

This invention relates to a mechanical movement adapted for use on windmills, pumps, engines, and wherever it is desired to vary the stroke of a reciprocatory rod without varying the throw of the crank or other driving means.

To these ends the invention consists in the novel combinations of parts and details of construction more fully hereinafter disclosed and particularly pointed out in the claims.

Referring to the accompanying drawings forming a part of this specification in which like numerals refer to like parts in all the views:—Figure 1 is a diagrammatic elevational view illustrating my invention as applied to a pump or an engine; Fig. 2 is a sectional detail view showing the parts in two positions; and Fig. 3 is a detail perspective view of the stroke changing device.

1 indicates any source of reciprocating motion, such for example, as the crank of an engine, or windmill; 2 a rod connecting said crank to the slide 3 and 4 a rod connecting said slide with an oscillating stroke changer 5, as at the pivot 6; 7 is a rod connected to the changer 5 as at the pivot 8, and is in turn connected as at 9 to the slide 10, joined as at 11 to the piston rod 12 of a pump or other apparatus 13. The stroke changer 5 is pivoted as at 14 to a suitable lever or support 15, which in turn is pivoted as at 16 to a support 17. It is preferred to locate the pivots 8, 6 and 14 at points 120° apart, and to also locate the pivots 6, 16 and 8 in the same straight line when the pivot 14 is in a line at right angles to the line joining said pivots 6, 16 and 8. The support or lever 15 is provided at its outer end with any suitable adjusting means, such as the rack or gear 20 and the worm 21.

The operation of my stroke changer is as follows: Supposing the parts to be in the positions shown in Fig. 1, the crank 1 will reciprocate the rod 2 a distance equal to the diameter of its circle 22, and the rod 7 will reciprocate the slide and the rod 4 a like distance. The pivot 6 of the rod 4 will cause the changer 5 to swing on the pivot 14, and as said pivot 6 moves up as seen in Fig. 4, the pivot 8 will move an equal distance in a downward direction. In other words, while the pivot 6 moves upwardly and therefore tends to shorten the thrust of the rod 4 on the rod 7, the pivot 8 moves downwardly and tends to lengthen this thrust or to move the rod 7 an additional distance equal to the above shortening effect. The net result of these movements of the pivots 6 and 8 is to reciprocate the pivot 9 the same distance that the crank 1 reciprocates the pivot 24 of the rod 4, and therefore to leave the length of the stroke unchanged. Next suppose the lever 15 to be turned on its pivot to the position shown in full lines, Fig. 2. It is now evident as the rod 4 moves to the right as seen in said figure, that the pivot 6 will not only move upwardly as in the preceding case, but it will cause the whole stroke changer 5 to swing into the dotted line position shown. During this movement the pivot 6 will travel to a position on a line making an obtuse angle with the rod 7, and thereby tending to somewhat shorten, as before, the stroke of said rod. On the other hand, the pivot 8 will move in a line almost parallel to or making an acute angle with the rod 7, and therefore will not only counteract the shortening effect of the pivot 6, but will actually lengthen the stroke of said rod 7, notwithstanding the stroke of the pivot 24 remains unchanged. Should the lever 20 be thrown over to the left as seen in Fig. 2, the stroke of the pivot 9 would be shortened instead of lengthened. In other words, the lever in its position shown in Fig. 1, has no effect on the length of the stroke, but when thrown to the left it lengthens the stroke by an amount depending upon the degree of movement; and when thrown to the right, it shortens the stroke to the same extent.

By having the stroke changer substantially triangular with arch-shaped sides with the pivots at the three corners, great rigidity is secured, and by having the stroke changer formed with double sides as shown in Fig. 3 it is possible to connect the rods 7 and 4 thereto so as to give a direct drive without any tendency to binding laterally.

For convenience in drawing the claims we will define the reciprocating parts connecting the motor and the stroke changer as the driving mechanism, and those reciprocating parts connecting the stroke changer and the piston or other body to be moved, as the driven mechanism.

My invention is particularly useful in windmills where I can cause the mill to normally employ a short stroke and therefore to operate in a light breeze and where with the aid of a simple and well known attachment not shown on the drawings I can cause the wind as it grows stronger to automatically shift the lever 15 and thereupon lengthen the stroke so as to cause the mill to do more work.

The invention is also particularly useful in connection with pumps used in mines, for the stroke may be changed at will to vary the work required of the pumps.

It will be observed that this invention enables one to deliver strokes from the rod 7 of varying lengths and in substantially the same direction as the strokes of the rods 2 and 4, so that the said rods 2, 4, 7, and 12 may all be located in substantially the same line. This is of special advantage when it comes to working in mine shafts and in other places where a change of direction of the power originally imparted is not desired.

What I claim is:—

1. In a stroke changer, the combination with reciprocating driving and driven mechanism, of a lever, a fixed pivot for said lever, means for moving said lever about its pivot and for holding it in any desired position, an oscillating member comprising a substantially triangular frame pivoted at one corner to said lever, and rods pivotally connecting the other two corners of said oscillating member with the driving and driven mechanism respectively, substantially as described.

2. In a mechanical movement, the combination with reciprocating driving and driven mechanism, of a lever arm pivoted at one end and provided at the other end with a sector, means for swinging said sector about the pivot of said lever and for locking it in any desired position, a triangular stroke changer pivoted to said lever arm between said pivot and said sector, and connecting rods pivoted to said triangular stroke changer and connected respectively to the driving and driven mechanism, substantially as described.

3. In a mechanical movement, the combination with reciprocating driving and driven mechanism, of a lever arm pivoted at one end and provided at the other end with a sector, means for swinging said sector about the pivot of said lever and for locking it in any desired position, a triangular stroke changer pivoted to said lever arm between said pivot and said sector, and connecting rods having their ends overlapping and pivoted to said triangular stroke changer and connected respectively to the driving and driven mechanism, substantially as described.

4. The combination with reciprocating driving and driven mechanism, of a stroke changer comprising a lever pivoted at one end with means for swinging said lever about its pivot and for holding it in any desired position, of a substantially triangular stroke changer pivoted to said lever, and connecting rods pivoted respectively to said triangular stroke changer and connected to the driving and driven mechanism, substantially as described.

5. The combination with reciprocating driving and driven mechanism, of a stroke changer comprising a lever pivoted at one end with means for swinging said lever about its pivot and for holding it in any desired position, of a substantially triangular stroke changer pivoted to said lever, and connecting rods having their ends overlapping and pivoted respectively to said triangular stroke changer and connected to the driving and driven mechanism, substantially as described.

6. The combination with reciprocating driving and driven mechanism, of a stroke changer comprising a lever pivoted at one end with means for swinging said lever about its pivot and for holding it in any desired position, said means comprising a sector carried by said lever, and a worm gear engaging said sector, of a substantially triangular stroke changer pivoted to said lever, and connecting rods pivoted respectively to said triangular stroke changer and connected to the driving and driven mechanism, substantially as described.

7. The combination with reciprocating driving and driven mechanism, of a stroke changer comprising a lever pivoted at one end with means for swinging said lever about its pivot and for holding it in any desired position, said means comprising a sector carried by said lever, and a worm gear engaging said sector, of a substantially triangular stroke changer pivoted to said lever, and connecting rods having their ends overlapping and pivoted respectively to said triangular stroke changer and connected to the driving and driven mechanism, substantially as described.

8. In a stroke changer, the combination with reciprocating driving and driven mechanism, of a lever, a fixed pivot for said lever, means for moving said lever about its pivot and for holding it in any desired position, an oscillating member comprising a triangular frame having arc-shaped sides fulcrumed on said lever, and rods pivotally connecting said oscillating member with the driving and driven mechanism respectively, substantially as described.

9. In a stroke changer, the combination with reciprocating driving and driven mechanism, of a lever, a fixed pivot for said lever, means for moving said lever about its pivot and for holding it in any desired position, an oscillating member comprising a substantially triangular slotted frame having arc-shaped sides, pivoted at one corner to said lever, and rods pivotally connecting the other two corners of said oscillating member with the driving and driven mechanism respectively, substantially as described.

10. In a mechanical movement, the combination with a reciprocating driving and driven mechanism, of a lever arm pivoted at one end and provided at the other end with a sector a worm gear for swinging said sector about the pivot of said lever and for locking it in any desired position, a triangular stroke changer having arc-shaped sides pivoted to said lever arm between said pivot and said sector, and connecting rods pivoted to said triangular stroke changer and connected respectively to the driving and driven mechanism, substantially as described.

In testimony whereof, I affix my signature, in presence of two witnesses.

GEORGE W. CAMPBELL.

Witnesses:
A. G. WILCOX,
ALBERT WILSON.

Copies of this patent may be obtained for five cents each, by addressing the "Commissioner of Patents, Washington, D. C."